(12) United States Patent
Teshima et al.

(10) Patent No.: US 9,140,268 B2
(45) Date of Patent: Sep. 22, 2015

(54) BEARING APPARATUS AND BLOWER FAN

(71) Applicant: NIDEC CORPORATION, Kyoto (JP)

(72) Inventors: Hiroyoshi Teshima, Kyoto (JP); Kiyoto Ida, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 358 days.

(21) Appl. No.: 13/767,183

(22) Filed: Feb. 14, 2013

(65) Prior Publication Data

US 2013/0259716 A1   Oct. 3, 2013

(30) Foreign Application Priority Data

Mar. 29, 2012  (JP) ................ 2012-077210

(51) Int. Cl.
*F04D 29/056* (2006.01)
*F04D 29/057* (2006.01)
*F04D 29/08* (2006.01)
*F16C 33/10* (2006.01)
*F16C 17/10* (2006.01)
*F16C 33/74* (2006.01)
*F04D 25/06* (2006.01)
*F04D 29/063* (2006.01)

(52) U.S. Cl.
CPC ............ *F04D 29/056* (2013.01); *F04D 25/062* (2013.01); *F04D 29/057* (2013.01); *F04D 29/063* (2013.01); *F16C 17/107* (2013.01); *F16C 33/107* (2013.01); *F16C 33/74* (2013.01); *F16C 33/745* (2013.01); *F16C 2360/46* (2013.01); *F16C 2370/12* (2013.01)

(58) Field of Classification Search
CPC . F04D 25/062; F04D 25/0626; F04D 29/057; F04D 29/0513; F04D 29/063; F04D 29/08; F04D 29/083; F16C 17/107; F16C 33/107; F16C 33/1085; F16C 2370/12; H02K 5/1675
USPC ................ 417/423.12; 384/100, 107; 310/90
See application file for complete search history.

(56) References Cited

U.S. PATENT DOCUMENTS 6,781,268 B2 *  8/2004  Oku ............................... 310/90
6,817,766 B2 * 11/2004  Gomyo ......................... 384/100
6,834,996 B2 * 12/2004  Gomyo et al. ................ 384/100

(Continued)

FOREIGN PATENT DOCUMENTS

CN     102852850 A    1/2013
CN     202789666 U    3/2013

(Continued)

*Primary Examiner* — Peter J Bertheaud
(74) *Attorney, Agent, or Firm* — Westerman, Hattori, Daniels & Adrian, LLP

(57) ABSTRACT

A bearing apparatus includes a bearing portion; a shaft; an upper thrust portion; a rotor cylindrical portion extending downward from an outer edge portion, and arranged radially outward of the bearing portion; and an annular seal cover fixed to an outer circumferential surface. A seal portion having a surface of lubricating oil defined therein is defined in a seal gap defined between an inner circumferential surface of the rotor cylindrical portion and an outer circumferential surface of the bearing portion. The seal cover includes a fixing portion fixed to the outer circumferential surface of the rotor cylindrical portion; and an inner flange portion extending radially inward from the fixing portion below a lower end portion of the rotor cylindrical portion, and having an inner circumferential portion arranged opposite to the outer circumferential surface of the bearing portion to define a vertical gap together with the outer circumferential surface.

17 Claims, 17 Drawing Sheets

(56) References Cited

U.S. PATENT DOCUMENTS

| | | | |
|---|---|---|---|
| 7,455,457 B2 * | 11/2008 | Gomyo et al. | 384/110 |
| 7,495,863 B2 * | 2/2009 | Ohno et al. | 360/99.08 |
| 8,213,114 B2 * | 7/2012 | Watanabe et al. | 360/99.08 |
| 8,665,556 B2 * | 3/2014 | Yamada et al. | 360/98.07 |
| 8,928,196 B2 * | 1/2015 | Smirnov | 310/90 |
| 9,016,947 B2 * | 4/2015 | Flores et al. | 384/104 |
| 2011/0115323 A1 * | 5/2011 | Jang et al. | 310/90 |
| 2013/0004114 A1 | 1/2013 | Hasegawa et al. | |
| 2013/0259716 A1 | 10/2013 | Teshima et al. | |

FOREIGN PATENT DOCUMENTS

| | | |
|---|---|---|
| CN | 20316570 U | 8/2013 |
| CN | 203161571 U | 8/2013 |
| CN | 203161620 U | 8/2013 |
| CN | 103362852 A | 10/2013 |
| CN | 102852850 B | 1/2015 |
| JP | 6-31199 Y2 | 8/1994 |
| JP | 2013-117300 A | 6/2013 |
| JP | 2013-204784 A | 10/2013 |

* cited by examiner

BEARING APPARATUS AND BLOWER FAN

BACKGROUND OF THE INVENTION

1. Field of the Invention

The present invention relates to a bearing apparatus. In particular, the present invention relates to a bearing apparatus installed in a blower fan.

2. Description of the Related Art

In recent years, electronic devices have been becoming more and more densely packed with components, and electronic components installed in the electronic devices and blower fans arranged to cool the electronic components have accordingly tended to be disposed close to each other. Such a blower fan is arranged to produce air currents through rotation of an impeller, i.e., a rotating body. In addition, the amount of heat generated in the electronic devices has been increasing year after year, and there has been a demand for an increase in rotation speed of the blower fans. The increase in the rotation speed of the blower fans leads to an increase in a peak value of vibration in each frequency, and then vibrations may exert harmful effects on the electronic components.

Therefore, in order to reduce vibrations which accompany the rotation of the blower fan, it is necessary to reduce oscillation of an axis of a rotating body of the blower fan and axial play of the rotating body. One specific method of achieving this is to adopt a fluid dynamic bearing as a bearing portion to support a circumference of a shaft through a lubricating oil so that vibrations generated in the rotating body can be attenuated. In addition, use of a thrust bearing will contribute to preventing tilting of the shaft. A bearing as described above is disclosed in JP-UM-B 06-31199.

In a brushless fan motor of a type illustrated in JP-UM-B 06-31199, a sleeve is fitted and thereby fixed in a central hole of an inner tubular portion of a case, and a stator is arranged on an outer circumference of the inner tubular portion. In addition, an annular member is fitted and thereby fixed to a lower end portion of a shaft. A thrust bearing is defined between a lower end surface of the sleeve and the annular member, with an axial gap defined therebetween. A radial dynamic pressure bearing is defined between the shaft and the sleeve on an upper side of the thrust bearing. The fan motor described in JP-UM-B 06-31199 has a problem in that dust and the like can easily enter into a gap defined between the sleeve and a combination of the shaft and the annular member through upper and lower opening ends of the gap.

In addition, a fluid dynamic bearing described in JP-UM-B 06-31199 has a problem in that it is difficult to maintain a high precision in axial position of the annular member fixed to the shaft, which may lead to permitting a variation in axial play of the bearing.

There is also a demand for a decrease in the outside diameter of the shaft of the motor in order to reduce a shaft loss through the bearing. Further, there is a demand for an increase in the diameter of the stator in order to obtain a high torque of the motor. In order to achieve both the reduction in the shaft loss and the high torque described above, it is necessary to arrange a bushing between the bearing portion and the stator. When the bushing is used, it is necessary to improve strength with which the bushing and a mounting plate are fixed to each other, and also to increase precision in positioning each of the stator and the mounting plate with respect to the bushing.

SUMMARY OF THE INVENTION

According to a preferred embodiment of the present invention, a bearing apparatus is provided which includes a bearing portion arranged substantially in a shape of a cylinder with a bottom; a shaft inserted in the bearing portion, and arranged to rotate about a central axis relative to the bearing portion; an upper thrust portion arranged to extend radially outward from an upper end portion of the shaft; a rotor cylindrical portion arranged to extend downward from an outer edge portion of the upper thrust portion, and arranged radially outward of the bearing portion; and an annular seal cover fixed to an outer circumferential surface of the rotor cylindrical portion. An inner circumferential surface of the rotor cylindrical portion and an outer circumferential surface of the bearing portion are arranged to together define a seal gap therebetween, the seal gap including a seal portion having a surface of a lubricating oil defined therein. An inner circumferential surface of the bearing portion and an outer circumferential surface of the shaft are arranged to together define a radial gap therebetween, the radial gap including a radial bearing portion arranged to support the shaft in a radial direction. An upper surface of the bearing portion and a lower surface of the upper thrust portion are arranged to together define a thrust gap therebetween, the thrust gap including a thrust bearing portion arranged to support the upper thrust portion in an axial direction. The seal cover includes a fixing portion fixed to the outer circumferential surface of the rotor cylindrical portion; and an inner flange portion arranged to extend radially inward from the fixing portion below a lower end portion of the rotor cylindrical portion, and having an inner circumferential portion arranged opposite to the outer circumferential surface of the bearing portion to define a vertical gap together with the outer circumferential surface of the bearing portion.

In accordance with the present invention, it is possible to reduce the likelihood that dust will enter into a bearing apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
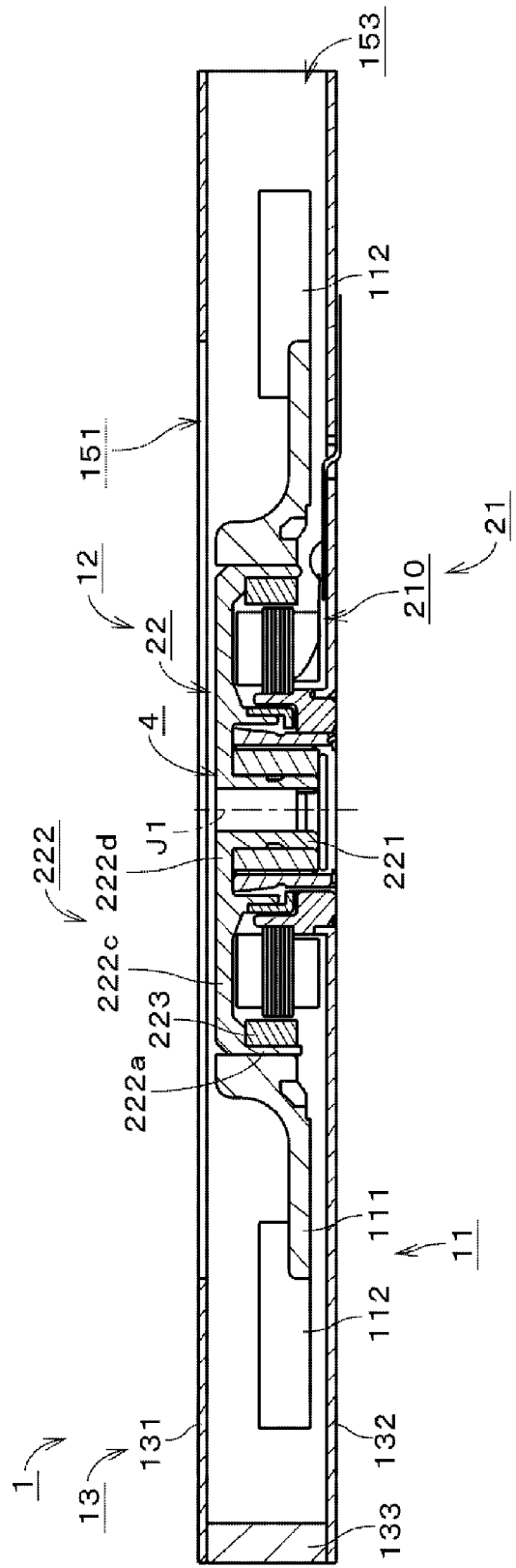
FIG. 1 is a cross-sectional view of a blower fan according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

First Preferred Embodiment

FIG. 1 is a cross-sectional view of a blower fan 1 according to a first preferred embodiment of the present invention. The blower fan 1 is a centrifugal fan, and is used, for example, to cool electronic components inside a notebook personal computer. The blower fan 1 includes an impeller 11, a motor 12, and a housing 13. The impeller 11 is arranged to extend radially outward from a rotating portion 22 of the motor 12. The impeller 11 is arranged to rotate about a central axis J1 through the motor 12.

The impeller 11 is made of a resin, and includes a substantially cylindrical cup 111 and a plurality of blades 112. An inner circumferential surface of the cup 111 is fixed to the rotating portion 22 of the motor 12. The blades 112 are arranged to extend radially outward from an outer circumferential surface of the cup 111 with the central axis J1 as a center. The cup 111 and the blades 112 are constructed as a single continuous member by a resin injection molding process.

The blower fan 1 is arranged to produce air currents through rotation of the impeller 11 about the central axis J1 caused by the motor 12.

The housing 13 is arranged to contain the motor 12 and the impeller 11. The housing 13 includes an upper plate portion 131, a mounting plate 132 (hereinafter referred to as a lower plate portion 132), and a side wall portion 133. The upper plate portion 131 is a substantially plate-shaped member made of a metal. The upper plate portion 131 is arranged on an upper side of the motor 12 and the impeller 11. The upper plate portion 131 includes one air inlet 151 extending therethrough in the vertical direction. The air inlet 151 is arranged to overlap with the impeller 11 and the motor 12 in an axial direction. The air inlet 151 is arranged substantially in the shape of a circle, and is arranged to overlap with the central axis J1.

The lower plate portion 132 is a substantially plate-shaped member produced by subjecting a metal sheet to press working. The lower plate portion 132 is arranged on a lower side of the motor 12 and the impeller 11. The lower plate portion 132 defines a portion of a stationary portion 21 of the motor 12.

The side wall portion 133 is made of a resin. The side wall portion 133 is arranged to cover sides of the impeller 11. That is, the side wall portion 133 is arranged radially outside the blades 112 to surround the blades 112. The upper plate portion 131 is fixed to an upper end portion of the side wall portion 133 through screws or by another fixing method. A lower end portion of the side wall portion 133 is joined to the lower plate portion 132 through insert molding. The side wall portion 133 is arranged substantially in the shape of the letter "U" when viewed in a direction parallel to the central axis J1, and includes an air outlet 153 which opens radially outward. In more detail, portions of the upper and lower plate portions 131 and 132 are arranged on an upper side and a lower side, respectively, of an opening of the side wall portion 133, and an area enclosed by the upper and lower plate portions 131 and 132 and the opening of the side wall portion 133 is the air outlet 153. Note that the side wall portion 133 may not necessarily be joined to the lower plate portion 132 through insert molding. Also note that the side wall portion 133 may not necessarily be made of the resin. Also note that each of the upper and lower plate portions 131 and 132 may be fixed to the side wall portion 133 by a fixing method not mentioned above.

Figure 2:
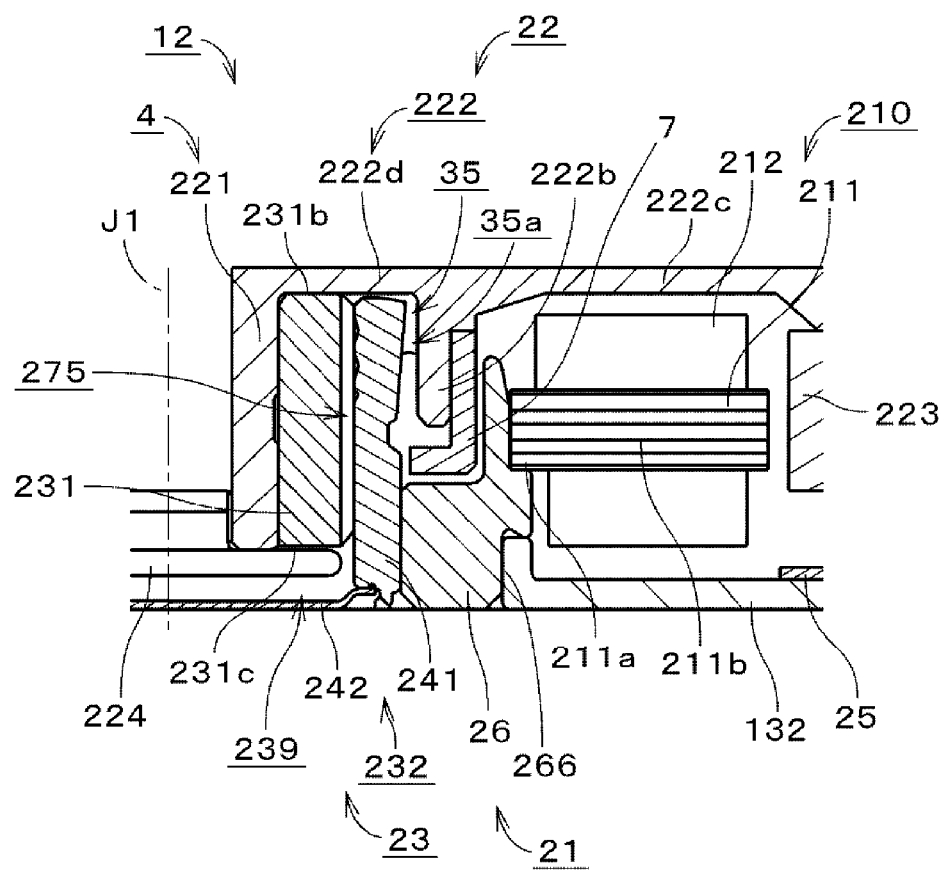
FIG. 2 is a cross-sectional view of a motor and its vicinity according to the first preferred embodiment.

FIG. 2 is a cross-sectional view of the motor 12 and its vicinity. The motor 12 is an outer-rotor motor. The motor 12 includes the stationary portion 21 and the rotating portion 22. Since a bearing mechanism 4 is defined by a portion of the stationary portion 21 and a portion of the rotating portion 22 as described below, the motor 12 can be considered to include the stationary portion 21, the bearing mechanism 4, and the rotating portion 22 when the bearing mechanism 4 is regarded as a component of the motor 12. The stationary portion 21 includes a bearing portion 23, the lower plate portion 132, a stator 210, a circuit board 25, and a bushing 26.

The bearing portion 23 is arranged radially inward of the stator 210. The bearing portion 23 includes a sleeve 231 and a bearing housing 232. The bearing portion 23 is arranged substantially in the shape of a cylinder with a bottom. The sleeve 231 is substantially cylindrical in shape and centered on the central axis J1. The sleeve 231 is a metallic sintered body. The sleeve 231 is impregnated with a lubricating oil. A plurality of circulation grooves 275, each of which is arranged to extend in the axial direction and is used for pressure regulation, are defined in an outer circumferential surface of the sleeve 231. The circulation grooves 275 are arranged at regular intervals in a circumferential direction. The bearing housing 232 is arranged substantially in the shape of a cylinder with a bottom, and includes a housing cylindrical portion 241 and a cap 242. The housing cylindrical portion 241 is substantially cylindrical in shape and centered on the central axis J1, and is arranged to cover the outer circumferential surface of the sleeve 231. The sleeve 231 is fixed to an inner circumferential surface of the housing cylindrical portion 241 through an adhesive. The bearing housing 232 is made of a metal. The cap 242 is fixed to a lower end portion of the housing cylindrical portion 241. The cap 242 is arranged to close a bottom portion of the housing cylindrical portion 241. Note that use of the adhesive to fix the sleeve 231 to the inner circumferential surface of the housing cylindrical portion 241 is not essential to the present invention. For example, the sleeve 231 may be fixed to the inner circumferential surface of the housing cylindrical portion 241 through press fit.

The bushing 26 is a substantially annular member. The bushing 26 is produced by subjecting a metallic member to a cutting process. An inner circumferential surface of the bushing 26 is fixed to a lower region of an outer circumferential surface of the housing cylindrical portion 241, i.e., a lower region of an outer circumferential surface of the bearing housing 232, through adhesion or press fit. Note that both adhesion and press fit may be used. Meanwhile, an outer circumferential surface of the bushing 26 is fixed to a hole portion of the lower plate portion 132. That is, the outer circumferential surface of the bushing 26 defines an attachment surface 266 to which the lower plate portion 132, which is arranged to support the bearing portion 23, is directly attached. Note that the lower plate portion 132 may be indirectly attached to the outer circumferential surface of the bushing 26, with another member intervening between the bushing 26 and the lower plate portion 132.

The stator 210 is a substantially annular member centered on the central axis J1. The stator 210 includes a stator core 211 and a plurality of coils 212 arranged on the stator core 211. The stator core 211 is defined by laminated silicon steel sheets, each of which is in the shape of a thin sheet. The stator core 211 includes a substantially annular core back 211a and a plurality of teeth 211b arranged to project radially outward from the core back 211a. A conducting wire is wound around each of the teeth 211b to define the coils 212. The circuit board 25 is arranged below the stator 210. Lead wires of the coils 212 are electrically connected to the circuit board 25. The circuit board 25 is a flexible printed circuit (FPC) board.

The rotating portion 22 includes a shaft 221, a thrust plate 224, a rotor holder 222, a rotor magnet 223, and a seal cover 7. The shaft 221 is arranged to have the central axis J1 as a center thereof.

Referring to FIG. 1, the rotor holder 222 is arranged substantially in the shape of a covered cylinder and centered on the central axis J1. The rotor holder 222 includes a tubular "magnet holding cylindrical portion" 222a, a cover portion 222c, and a first thrust portion 222d. The magnet holding cylindrical portion 222a, the cover portion 222c, and the first thrust portion 222d are defined integrally with one another. The first thrust portion 222d, which corresponds to an upper thrust portion, is arranged to extend radially outward from an upper end portion of the shaft 221. The cover portion 222c is arranged to extend radially outward from the first thrust portion 222d. The upper plate portion 131 is arranged above the cover portion 222c and the first thrust portion 222d. A lower surface of the cover portion 222c is a substantially annular surface arranged around the shaft 221. Referring to FIG. 2, the first thrust portion 222d is arranged axially opposite each of an upper surface 231b of the sleeve 231 and an upper surface of the housing cylindrical portion 241.

The thrust plate 224, which corresponds to a lower thrust portion, includes a substantially disk-shaped portion arranged to extend radially outward. The thrust plate 224 is fixed to a lower end portion of the shaft 221, and is arranged to extend radially outward from the lower end portion thereof. The thrust plate 224 is accommodated in a plate accommodating portion 239 defined by a lower surface 231c of the sleeve 231, an upper surface of the cap 242, and a lower portion of the inner circumferential surface of the housing cylindrical portion 241. An upper surface of the thrust plate 224 is a substantially annular surface arranged around the shaft 221. The upper surface of the thrust plate 224 is arranged axially opposite the lower surface 231c of the sleeve 231, i.e., a downward facing surface in the plate accommodating portion 239. Hereinafter, the thrust plate 224 will be referred to as a "second thrust portion 224". A lower surface of the second thrust portion 224 is arranged opposite to the upper surface of the cap 242 of the bearing housing 232. The shaft 221 is inserted in the sleeve 231. Note that the second thrust portion 224 may be defined integrally with the shaft 221.

The shaft 221 is defined integrally with the rotor holder 222. The shaft 221 and the rotor holder 222 are produced by subjecting a metallic member to a cutting process. That is, the cover portion 222c and the shaft 221 are continuous with each other. Note that the shaft 221 may be defined by a member separate from the rotor holder 222. In this case, the upper end portion of the shaft 221 is fixed to the cover portion 222c of the rotor holder 222. Referring to FIG. 1, the rotor magnet 223 is fixed to an inner circumferential surface of the magnet holding cylindrical portion 222a, which is arranged to extend axially downward from a radially outer end portion of the cover portion 222c of the rotor holder 222.

Referring to FIG. 2, the rotor holder 222 further includes a substantially annular "annular tubular portion" 222b arranged to extend downward from an outer edge portion of the first thrust portion 222d. The annular tubular portion 222b will be hereinafter referred to as a "rotor cylindrical portion 222b". The rotor cylindrical portion 222b of the rotor holder 222 is arranged radially inward of the stator 210. The rotor cylindrical portion 222b is arranged radially outward of the bearing housing 232. An inner circumferential surface of the rotor cylindrical portion 222b is arranged radially opposite an outer circumferential surface of an upper portion of the housing cylindrical portion 241. A seal gap 35 is defined between the inner circumferential surface of the rotor cylindrical portion 222b and the outer circumferential surface of the housing cylindrical portion 241. A seal portion 35a having a surface of the lubricating oil defined therein is defined in the seal gap 35.

Referring to FIG. 1, the inner circumferential surface of the cup 111 is fixed to an outer circumferential surface of the magnet holding cylindrical portion 222a of the rotor holder 222. The blades 112 are arranged outside the outer circumferential surface of the magnet holding cylindrical portion 222a. The upper end portion of the shaft 221 is fixed to the impeller 11 through the rotor holder 222. Note that the impeller 11 may be defined integrally with the rotor holder 222. In this case, the upper end portion of the shaft 221 is fixed to the impeller 11 in a direct manner.

The rotor magnet 223 is substantially cylindrical in shape and centered on the central axis J1. As described above, the rotor magnet 223 is fixed to the inner circumferential surface of the magnet holding cylindrical portion 222a. The rotor magnet 223 is arranged radially outward of the sleeve 210.

Figure 3:
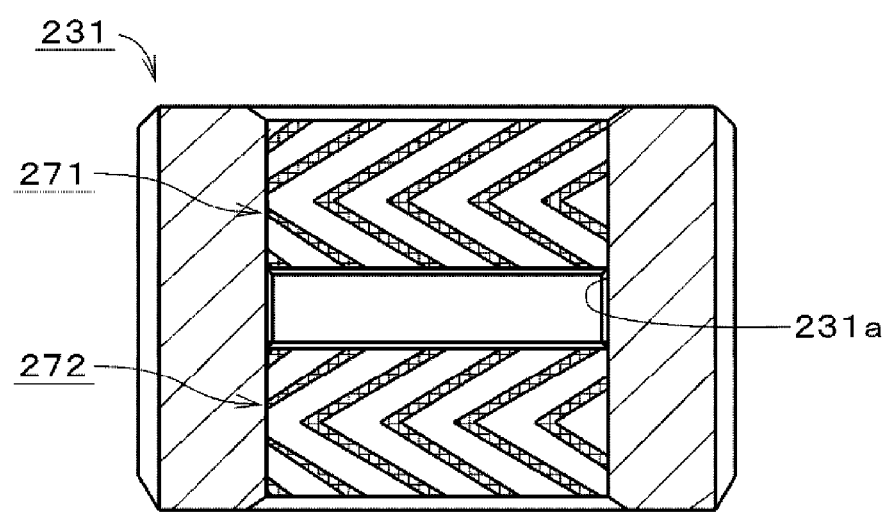
FIG. 3 is a cross-sectional view of a sleeve according to the first preferred embodiment.
Figure 4:
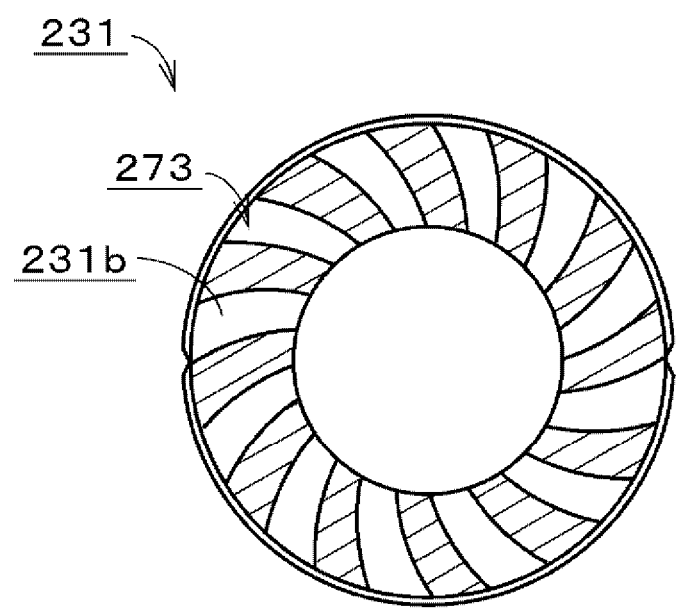
FIG. 4 is a plan view of the sleeve.
Figure 5:
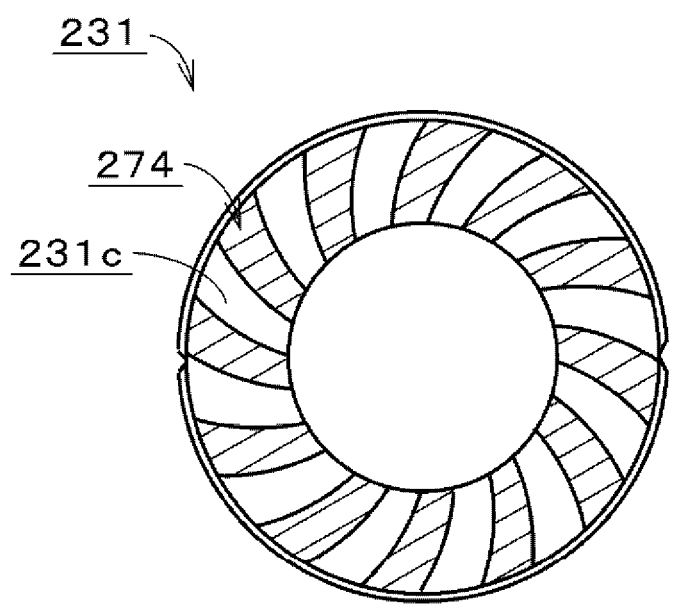
FIG. 5 is a bottom view of the sleeve.

FIG. 3 is a cross-sectional view of the sleeve 231. A first radial dynamic pressure groove array 271 and a second radial dynamic pressure groove array 272 are defined in an upper portion and a lower portion, respectively, of an inner circumferential surface 231a of the sleeve 231. Each of the first and second radial dynamic pressure groove arrays 271 and 272 is made up of a plurality of grooves arranged in a herringbone pattern. FIG. 4 is a plan view of the sleeve 231. A first thrust dynamic pressure groove array 273 is defined in the upper surface 231b of the sleeve 231. The first thrust dynamic pressure groove array 273 is made up of a plurality of grooves arranged in a spiral pattern. FIG. 5 is a bottom view of the sleeve 231. A second thrust dynamic pressure groove array 274 is defined in the lower surface 231c of the sleeve 231. The second thrust dynamic pressure groove array 274 is made up of a plurality of grooves arranged in the spiral pattern.

Figure 6:
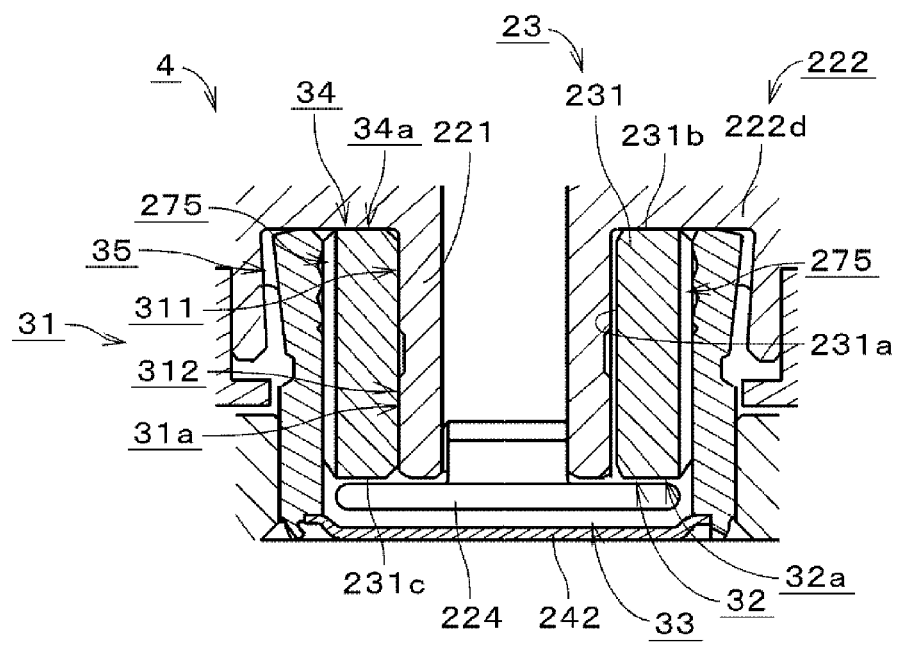
FIG. 6 is a cross-sectional view of a bearing portion and its vicinity according to the first preferred embodiment.

FIG. 6 is a cross-sectional view of the bearing portion 23 and its vicinity. A radial gap 31 is defined between an outer circumferential surface of the shaft 221 and the inner circumferential surface 231a of the sleeve 231. The radial gap 31 includes a first radial gap 311 and a second radial gap 312, which is arranged on a lower side of the first radial gap 311. The first radial gap 311 is defined between the outer circumferential surface of the shaft 221 and a portion of the inner circumferential surface 231a of the sleeve 231 in which the first radial dynamic pressure groove array 271 illustrated in FIG. 3 is defined. The lubricating oil is arranged in the first radial gap 311. The second radial gap 312 is defined between the outer circumferential surface of the shaft 221 and a portion of the inner circumferential surface 231a of the sleeve 231 in which the second radial dynamic pressure groove array 272 illustrated in FIG. 3 is defined. The lubricating oil is arranged in the second radial gap 312. The first and second radial gaps 311 and 312 are arranged to together define a radial dynamic pressure bearing portion 31a arranged to produce a fluid dynamic pressure in the lubricating oil. The shaft 221 is supported in a radial direction by the radial dynamic pressure bearing portion 31a.

A first thrust gap 34 is defined between a portion of the upper surface 231b of the sleeve 231 in which the first thrust dynamic pressure groove array 273 is defined and the lower surface of the first thrust portion 222d, i.e., the upper thrust portion. The lubricating oil is arranged in the first thrust gap 34. The first thrust gap 34 is arranged to define an upper thrust dynamic pressure bearing portion 34a arranged to produce a fluid dynamic pressure in the lubricating oil. The first thrust portion 222d is supported in the axial direction by the upper thrust dynamic pressure bearing portion 34a.

A second thrust gap 32 is defined between a portion of the lower surface 231c of the sleeve 231 in which the second thrust dynamic pressure groove array 274 is defined and the upper surface of the second thrust portion 224, i.e., the lower thrust portion. The lubricating oil is arranged in the second thrust gap 32. The second thrust gap 32 is arranged to define a lower thrust dynamic pressure bearing portion 32a arranged to produce a fluid dynamic pressure in the lubricating oil. The second thrust portion 224 is supported in the axial direction by the lower thrust dynamic pressure bearing portion 32a. Provision of the upper and lower thrust dynamic pressure bearing portions 34a and 32a contributes to reducing a variation in axial play of the shaft 221. The upper and lower thrust dynamic pressure bearing portions 34a and 32a are arranged to be in communication with each other through the circulation grooves 275.

A third thrust gap 33 is defined between the upper surface of the cap 242 of the bearing housing 232 and the lower surface of the second thrust portion 224.

In the motor 12, the seal gap 35, the first thrust gap 34, the radial gap 31, the second thrust gap 32, and the third thrust gap 33 are arranged to together define a single continuous bladder structure, and the lubricating oil is arranged continuously in this bladder structure. Within the bladder structure, a surface of the lubricating oil is defined only in the seal gap 35. The bladder structure contributes to easily preventing a leakage of the lubricating oil.

Referring to FIG. 2, in the motor 12, the shaft 221, the first thrust portion 222d, the rotor cylindrical portion 222b, which is arranged to extend downward from the outer edge portion of the first thrust portion 222d, the second thrust portion 224, the bearing portion 23, the bushing 26, the seal cover 7, and the lubricating oil are arranged to together define the bearing mechanism 4, which is a bearing apparatus. Hereinafter, each of the shaft 221, the first thrust portion 222d, the rotor cylindrical portion 222b, the second thrust portion 224, the bearing portion 23, the bushing 26, and the seal cover 7 will be referred to as a portion of the bearing mechanism 4. In the bearing mechanism 4, the shaft 221, the first thrust portion 222d, the second thrust portion 224, and the seal cover 7 are arranged to rotate about the central axis J1 relative to the bearing portion 23 with the lubricating oil intervening therebetween.

In the motor 12, once power is supplied to the stator 210, a torque centered on the central axis J1 is produced between the rotor magnet 223 and the stator 210. The rotating portion 22 and the impeller 11 are supported through the bearing mechanism 4 illustrated in FIG. 1 such that the rotating portion 22 and the impeller 11 are rotatable about the central axis J1 with respect to the stationary portion 21. The rotation of the impeller 11 causes an air to be drawn into the housing 13 through the air inlet 151 and then sent out through the air outlet 153.

Figure 7:
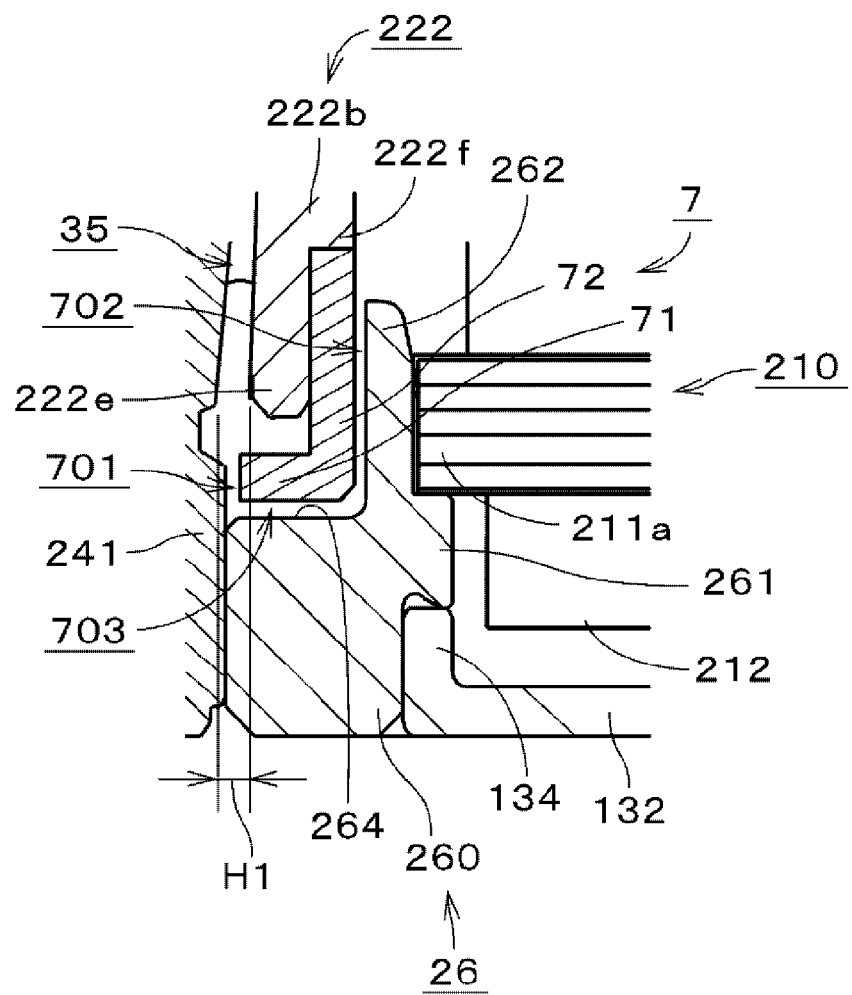
FIG. 7 is a cross-sectional view of a bushing and its vicinity according to the first preferred embodiment.

FIG. 7 is a cross-sectional view of the bushing 26 and its vicinity. The seal cover 7 includes an inner flange portion 71 and a fixing portion 72. The inner flange portion 71 is in the shape of an annular plate. The fixing portion 72 is cylindrical in shape. The fixing portion 72 is fixed to an outer circumferential surface of the rotor cylindrical portion 222b. The inner flange portion 71 is arranged to extend radially inward from a lower end of the fixing portion 72 below a lower end portion 222e of the rotor cylindrical portion 222b.

The inner circumferential surface of the bushing 26 is fixed to the lower region of the outer circumferential surface of the housing cylindrical portion 241. That is, the bushing 26 is fixed to the outer circumferential surface of the housing cylindrical portion 241 through press fit below the inner flange portion 71. Note that the bushing 26 may be fixed to the outer circumferential surface of the housing cylindrical portion 241 by another fixing method than press fit or by a combination of press fit and another fixing method. The bushing 26 includes a raised portion 261 arranged to project radially outward from the outer circumferential surface thereof. The raised portion 261 is arranged in an annular shape, extending continuously in the circumferential direction. That is, the raised portion 261 is defined by a single continuous portion. Thus, when the raised portion 261 is machined into a continuous annular shape, machining the bushing 26 using a lathe is made possible, which may lead to improved productivity.

The bushing 26 further includes a substantially cylindrical "bushing cylindrical portion" 262 arranged to extend upward on an upper side of the raised portion 261. Hereinafter, an entire portion of the bushing 26 except for the bushing cylindrical portion 262 will be referred to as a "bushing base portion 260". The bushing base portion 260 is arranged to extend radially outward from an outer circumferential surface of the bearing portion 23. The bushing cylindrical portion 262 is arranged to extend upward continuously from the bushing base portion 260. The stator 210 is fixed to an outer circumferential surface of the bushing cylindrical portion 262. That is, an inner circumferential surface of the core back 211a of the stator 210 is fixed to the bushing 26 on the upper side of the raised portion 261. A lower end of each coil 212 is arranged at a level lower than that of a lower surface of the raised portion 261.

A lower end of the core back 211a is arranged to be in axial contact with an upper surface of the raised portion 261 of the bushing 26. Positioning of the stator 210 with respect to the bushing 26 can thus be accomplished easily. Note that the raised portion 261 and the core back 221a may be arranged to be out of contact with each other.

The seal cover 7 is arranged inside of the bushing cylindrical portion 262. The inner flange portion 71 is arranged to cover the seal gap 35. An inner circumferential portion of the inner flange portion 71 is arranged opposite to the outer circumferential surface of the housing cylindrical portion 241 to define a minute first vertical gap 701 together with the outer circumferential surface of the housing cylindrical portion 241. A minimum radial width of the first vertical gap 701 is arranged to be smaller than a maximum width H1 of the seal gap 35. The maximum width H1 of the seal gap 35 refers to a maximum width of a region thereof which is usable to hold the lubricating oil therein.

Provision of the first vertical gap 701 contributes to preventing an air including a lubricating oil evaporated from the seal gap 35 from traveling out of the bearing portion 23. This contributes to reducing evaporation of the lubricating oil out of the bearing portion 23. In other words, the first vertical gap 701 is arranged to define a labyrinth structure. Because each of the housing cylindrical portion 241 and the seal cover 7, which together define the first vertical gap 701, is produced by subjecting a metallic member to a cutting process, it is possible to define the first vertical gap 701 with high precision.

An inner circumferential surface of the bushing cylindrical portion 262 is arranged radially opposite an outer circumferential surface of the fixing portion 72 of the seal cover 7. The bushing cylindrical portion 262 is a radially opposing portion arranged opposite to the outer circumferential surface of the fixing portion 72. A minute second vertical gap 702 extending in the axial direction is defined between the inner circumferential surface of the bushing cylindrical portion 262 and the outer circumferential surface of the fixing portion 72. Because each of the bushing 26 and the seal cover 7, which together define the second vertical gap 702, is produced by subjecting the metallic member to the cutting process, it is possible to define the second vertical gap 702 with high precision. A minimum radial width of the second vertical gap 702 is arranged to be smaller than the maximum width H1 of the seal gap 35. The minimum width of the second vertical gap 702 is preferably arranged to be smaller than the minimum width of the first vertical gap 701.

The bushing 26 includes an annular surface 264 centered on the central axis J1, arranged to be substantially perpendicular to the central axis J1, and arranged radially inward of the bushing cylindrical portion 262. The annular surface 264 is an upper surface of the bushing base portion 260, and is arranged axially opposite a lower surface of the inner flange portion 71. The bushing base portion 260 is an axially opposing portion arranged axially opposite the lower surface of the inner flange portion 71. A horizontal gap 703 extending in the radial direction is defined between the bushing base portion 260 and the inner flange portion 71. A minimum axial width of the horizontal gap 703 is arranged to be smaller than the maximum width H1 of the seal gap 35.

A lower end of the first vertical gap 701 is joined to a radially inner end portion of the horizontal gap 703. A radially outer end portion of the horizontal gap 703 is joined to a lower end of the second vertical gap 702. The second vertical gap 702 is joined to a space between the stator 210 and the rotor holder 222. A more complicated labyrinth structure is thereby achieved. Thus, the bushing 26 is a seal cover arranged to cover the seal gap 35 in an indirect manner.

The outer circumferential surface of the rotor cylindrical portion 222b includes a projecting portion 222f in the shape of a shoulder defined by an increase in the diameter of the rotor cylindrical portion 222b. That is, the projecting portion 222f is arranged to project radially outward relative to a lower portion of the rotor cylindrical portion 222b. An upper end of the fixing portion 72 of the seal cover 7 is arranged to be in axial contact with a surface of the projecting portion 222f which has a normal oriented downward. The axial position of the seal cover 7 is thereby set accurately.

The lower plate portion 132 includes a lower plate cylindrical portion 134 arranged substantially in the shape of a cylinder and centered on the central axis J1. The lower plate cylindrical portion 134 is fixed to a portion of the outer circumferential surface of the bushing 26 which is below the raised portion 261 through press fit. That is, the bushing 26 is press fitted to the lower plate cylindrical portion 134. The bushing 26 is securely fixed to the lower plate cylindrical portion 134 due to the bushing 26 being fixed to the lower plate cylindrical portion 134 through press fit. As a result, the housing cylindrical portion 241 is securely fixed to the lower plate portion 132.

In addition, since the lower plate cylindrical portion 134 is fixed to the bushing 26 on a lower side of the raised portion 261, an inner circumferential surface of the lower plate cylindrical portion 134 is arranged radially inward of a radially outer end of the raised portion 261. Thus, a reduction in the radial dimension of a portion of the lower plate cylindrical portion 134 which projects radially outward from the radially outer end of the raised portion 261 is achieved. An upper end of the lower plate cylindrical portion 134 is arranged to be in axial contact with the lower surface of the raised portion 261. This contributes to improving precision with which each of the stator 210 and the lower plate portion 132 is positioned with respect to the bushing 26. Note that the lower plate cylindrical portion 134 and the raised portion 261 may be arranged to be out of contact with each other.

A portion of the outer circumferential surface of the bushing 26 to which the lower plate cylindrical portion 134 is fixed is arranged radially inward of a portion of the outer circumferential surface of the bushing cylindrical portion 262 to which the core back 211a is fixed.

An end surface of the raised portion 261 of the bushing 26, that is, a surface of the raised portion 261 which faces radially outward, is arranged to coincide with an outer circumferential surface of the lower plate cylindrical portion 134 in the radial direction, or arranged radially outward of the outer circumferential surface of the lower plate cylindrical portion 134. This contributes to preventing any coil 212 from coming into contact with the lower plate cylindrical portion 134 even in the case where the lower end of each coil 212 is arranged at a level lower than that of the lower surface of the raised portion 261. This contributes to reducing the height of the motor 12, or increasing a space factor of each coil 212. Moreover, prevention of the contact between each coil 212 and the lower plate cylindrical portion 134 contributes to preventing a break in the conducting wire of the coil 212.

As described above, the bearing portion 23 can be made up of component units and securely fixed to the lower plate portion 132 through intervention of the bushing 26.

Next, a procedure of manufacturing the blower fan 1 will now be described below. First, the bearing portion 23 is assembled with the shaft 221 integrally defined with the rotor holder 222 illustrated in FIG. 1 arranged inside the bearing portion 23. The lubricating oil is injected into the assembly including the rotor holder 222 and the bearing portion 23 through the seal gap 35. Thereafter, the seal cover 7 is attached to the rotor cylindrical portion 222b. As a result, the first vertical gap 701 is defined, and the seal gap 35 is covered with the seal cover 7.

Next, the rotor magnet 223 is fixed to the inner circumferential surface of the magnet holding cylindrical portion 222a of the rotor holder 222. The impeller 11 is fixed to the outer circumferential surface of the magnet holding cylindrical portion 222a of the rotor holder 222.

Next, the stator 210 is fixed to the outer circumferential surface of the bushing cylindrical portion 262 of the bushing 26. After the stator 210 is fixed to the bushing 26, the bearing portion 23 is fixed to the inner circumferential surface of the bushing 26. As a result, each of the horizontal gap 703 and the second vertical gap 702 is defined. Note that the vertical direction assumed in the foregoing description does not need to coincide with the direction of gravity.

Thereafter, a weight is arranged on a lower end portion of the cup 111 or its vicinity. The weight is an adhesive containing a metal having a high specific gravity, such as tungsten or the like. Note that the weight may be arranged on the lower end portion of the cup ill or its vicinity before the rotor magnet 223 is fixed to the inner circumferential surface of the magnet holding cylindrical portion 222a of the rotor holder 222, and/or before the impeller 11 is fixed to the outer circumferential surface of the magnet holding cylindrical portion 222a of the rotor holder 222. A reduction in unbalance of the impeller 11 and the rotating portion 22 of the motor 12 can be achieved by arranging the weight on the lower end portion of the cup 111 of the impeller 11 or its vicinity. The reduction in the unbalance contributes to reducing vibrations of the blower fan 1 owing to displacement of a center of gravity of the impeller 11 and the motor 12 from the central axis J1.

After the balance correction, the lower plate portion 132 is fixed to the bushing 26 from below the bushing 26, so that manufacture of the bearing mechanism 4 of the blower fan 1 is completed.

The blower fan 1 including the bearing mechanism 4 according to the first preferred embodiment has been described above. The labyrinth structure is defined by covering the seal gap 35 with the seal cover 7 and the bushing 26, and the likelihood that dust will enter into the bearing mechanism 4 is reduced. Moreover, the labyrinth structure is complicated through the first vertical gap 701, the horizontal gap 703, and the second vertical gap 702, which contributes to more securely preventing dust from entering into the bearing mechanism 4. This contributes to preventing a deterioration in bearing performance of the bearing mechanism 4.

Even when a so-called bearing unit, in which the shaft 221 is arranged inside the bearing portion 23, is constructed, the bearing portion 23 can be securely fixed to the lower plate portion 132 through the intervention of the bushing 26.

In addition, since the seal gap 35 is covered with the seal cover 7 before the bushing 26 is attached to the bearing portion 23, the likelihood that dust will enter into an assembly including the bearing portion 23, more specifically, an assembly made up of all components of the bearing mechanism 4 except the bushing 26, during assemblage of the motor 12 is reduced. Therefore, a process of fitting the assembly including the bearing portion 23 to another member of the blower fan 1 does not need to be carried out in an extremely clean space. Even in the case where both assemblage of the assembly including the bearing portion 23 and the fitting of this assembly to the other member of the blower fan 1 are carried out in a clean room, covering of the seal gap 35 with the seal cover 7 contributes to reducing the likelihood that an extraneous material will be adhered to the surface of the lubricating oil. As a result, an improvement in reliability of the bearing mechanism 4 is achieved.

In the case of a blower fan which allows the lower plate portion to be attached to the bushing only from above the bushing, fixing of the bushing to the bearing housing needs to be performed after the lower plate portion is attached to the bushing. In contrast, in the case of the blower fan 1, it is possible to attach the lower plate portion 132 to the bushing 26 from below the bushing 26 after the bearing mechanism 4 is assembled. Thus, an improvement in flexibility in assembling the blower fan 1 is achieved.

Figure 8:
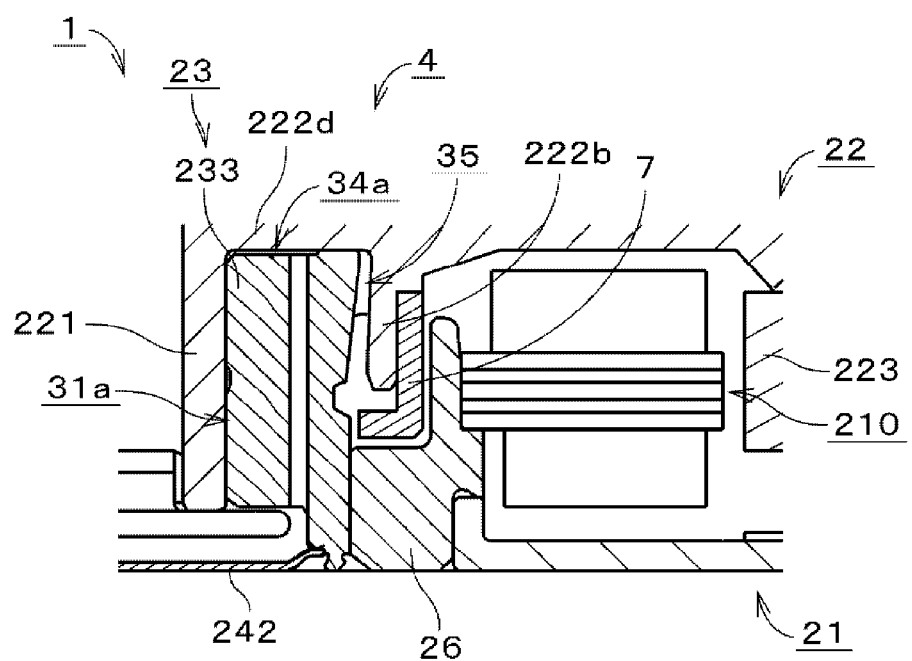
FIG. 8 is a cross-sectional view of a motor and its vicinity according to a modification of the first preferred embodiment.

FIG. 8 is a diagram illustrating a bearing mechanism 4 according to a modification of the first preferred embodiment. A bearing portion 23 includes a cylindrical sleeve 233 arranged radially outside a shaft 221 to surround the shaft 221, and a cap 242 arranged to close a bottom portion of the sleeve 233. The bearing portion 23 is arranged substantially in the shape of a cylinder with a bottom. The sleeve 233 is produced, for example, by subjecting a metallic member made of stainless steel or the like to a cutting process. The cap 242 is directly fixed to the sleeve 233. A rotor cylindrical portion 222b is arranged to extend downward, radially outside of the sleeve 233. A seal gap 35 is defined between an upper portion of an outer circumferential surface of the sleeve 233 and an inner circumferential surface of the rotor cylindrical portion 222b. The seal gap 35 has a surface of a lubricating oil defined therein. The seal gap 35 is covered with a seal cover 7 in a manner similar to that illustrated in FIG. 2. A lower portion of the outer circumferential surface of the sleeve 233 is fixed to a bushing 26.

In the bearing mechanism 4, a radial gap is defined between an inner circumferential surface of the sleeve 233 and an outer circumferential surface of the shaft 221, and a radial dynamic pressure bearing portion 31a arranged to support the shaft 221 in the radial direction is defined in the radial gap. In addition, a thrust gap is defined between an upper surface of the sleeve 233 and a lower surface of a first thrust portion 222d. An upper thrust dynamic pressure bearing portion 34a is defined in the thrust gap. No thrust dynamic pressure bearing portion is defined on a lower side of the sleeve 233. In this case, an axial magnetic center of a stator 210 is arranged at a level lower than that of an axial magnetic center of a rotor magnet 223. A magnetic attraction force that attracts the rotor magnet 223 downward is thereby generated between the stator 210 and the rotor magnet 223. This contributes to reducing a force that lifts a rotating portion 22 relative to a stationary portion 21 during rotation of a blower fan 1. The bearing mechanism 4 according to the present modification of the first preferred embodiment is otherwise similar in structure to the bearing mechanism 4 illustrated in FIG. 2.

Figure 9:
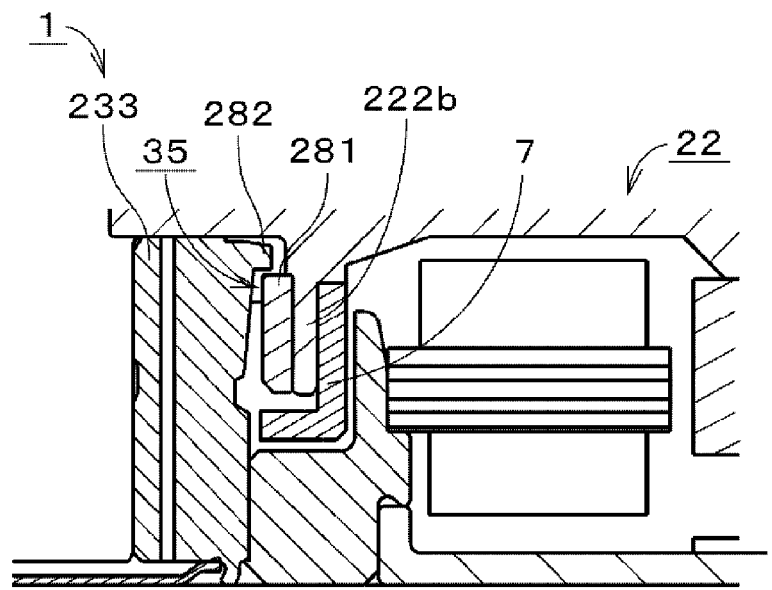
FIG. 9 is a cross-sectional view of a motor and its vicinity according to another modification of the first preferred embodiment.

Referring to FIG. 9, a tubular member 281 may be arranged on an inner circumferential surface of a rotor cylindrical portion 222b in a blower fan 1 according to a modification of the first preferred embodiment. In this modification of the first preferred embodiment, a sleeve 233 includes a projecting portion 282 arranged to project radially outward from a top portion of an outer circumferential surface thereof, and no thrust plate is arranged on a lower end of a shaft 221. The tubular member 281 and the projecting portion 282 are arranged axially opposite each other. A seal gap 35 is defined between an inner circumferential surface of the tubular member 281 and the outer circumferential surface of the sleeve 233. The seal gap 35 has a surface of a lubricating oil defined therein. The seal gap 35 is covered with a seal cover 7. The blower fan 1 according to the present modification of the first preferred embodiment is otherwise similar in structure to the blower fan 1 illustrated in FIG. 8. Even if a force that acts to move a rotating portion 22 upward is generated during drive of the blower fan 1, upward movement of the rotating portion 22 is prevented by axial contact between the projecting portion 282 and the tubular member 281.

Second Preferred Embodiment

Figure 10:
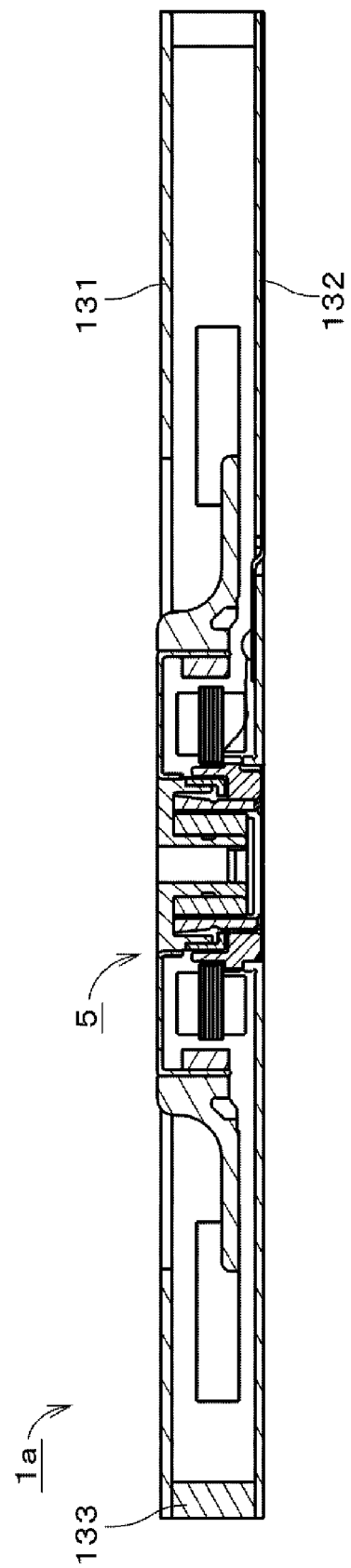
FIG. 10 is a cross-sectional view of a blower fan according to a second preferred embodiment of the present invention.
Figure 11:
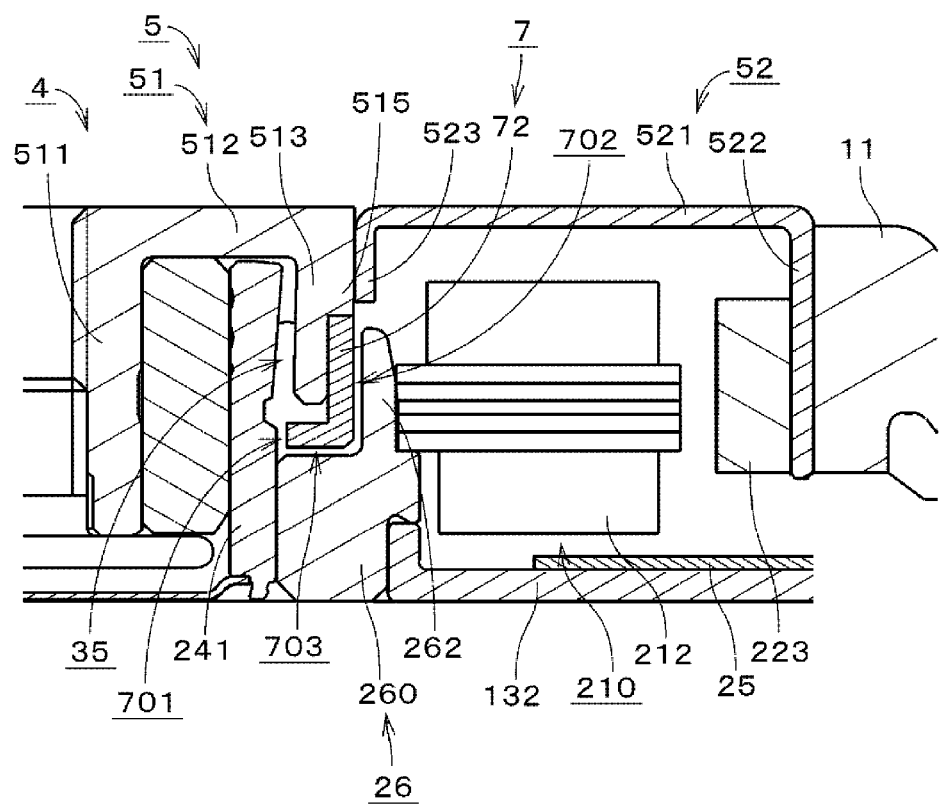
FIG. 11 is a cross-sectional view of the blower fan.

FIG. 10 is a cross-sectional view of a blower fan 1a according to a second preferred embodiment of the present invention. The blower fan 1a includes a rotor holder 5, which has a structure different from that of the rotor holder 222 of the blower fan 1 illustrated in FIG. 1. The blower fan 1a is otherwise similar in structure to the blower fan 1. Accordingly, like members or portions are designated by like reference numerals, and redundant description is omitted. FIG. 11 is a diagram illustrating a bearing mechanism 4 and its vicinity in an enlarged form. The rotor holder 5 includes a first holder member 51 and a second holder member 52. The first holder member 51 is arranged to define a portion of the bearing mechanism 4.

The first holder member 51 includes a shaft 511, a first thrust portion 512, and a rotor cylindrical portion 513. The rotor cylindrical portion 513 is arranged to extend downward from an outer edge portion of the first thrust portion 512. It is assumed that an outer circumferential surface of the first thrust portion 512 is an upper portion of an outer circumferential surface of the first holder member 51, and that an outer circumferential surface of the rotor cylindrical portion 513 is a portion of the outer circumferential surface of the first holder member 51 which is below the upper portion thereof.

The second holder member 52 is a substantially plate-shaped annular member, and is molded by subjecting a metallic plate member to press working. The second holder member 52 includes a cover portion 521 and a "magnet holding cylindrical portion" 522. An inner edge portion of the cover portion 521 includes a "cover portion cylindrical portion" 523 arranged to extend downward. A rotor magnet 223 is fixed to an inner circumferential surface of the magnet holding cylindrical portion 522. An impeller 11 is fixed to an outer circumferential surface of the magnet holding cylindrical portion 522.

Regarding the rotor holder 5, the cover portion cylindrical portion 523 is press fitted to the rotor cylindrical portion 513, whereby the first holder member 51 is fixed to the second holder member 52.

As in the first preferred embodiment, a seal cover 7 is fixed to the outer circumferential surface of the rotor cylindrical portion 513. The outer circumferential surface of the rotor cylindrical portion 513 includes a projecting portion 515 in the shape of a shoulder defined by an increase in the diameter of the rotor cylindrical portion 513. That is, the projecting portion 515 is arranged to project radially outward relative to a lower portion of the rotor cylindrical portion 513. An upper end of a fixing portion 72 of the seal cover 7 is arranged to be in axial contact with a surface of the projecting portion 515 which has a normal oriented downward. The axial position of the seal cover 7 is thereby set accurately. Note that the outer circumferential surface of the first holder member 51 is arranged to have a constant diameter from the projecting portion 515 upward. In other words, an upper portion of the outer circumferential surface of the rotor cylindrical portion 513 and the outer circumferential surface of the first thrust portion 512 are arranged to be flush with each other.

When the blower fan 1a is assembled, the bearing mechanism 4 including the first holder member 51 is assembled beforehand. Note that, regarding the bearing mechanism 4, a lubricating oil is injected into a seal gap 35 before the seal cover 7 and a bushing 26 are attached to the rotor cylindrical portion 513 and a housing cylindrical portion 241, respectively.

In the bearing mechanism 4, the seal cover 7 is arranged to cover the seal gap 35. As in the first preferred embodiment, a bushing base portion 260 is an axially opposing portion, and a bushing cylindrical portion 262 is a radially opposing portion. A labyrinth structure is defined by the housing cylindrical portion 241, the seal cover 7, and the bushing 26. A minimum width of each of a first vertical gap 701, a second vertical gap 702, and a horizontal gap 703 is arranged to be smaller than a maximum width of the seal gap 35.

Next, a lower plate portion 132 is attached to a lower portion of an outer circumferential surface of the bushing 26. A stator 210 is attached to an upper portion of the outer circumferential surface of the bushing 26. Lead wires of coils 212 are connected to a circuit board 25 arranged on the lower plate portion 132.

Next, the rotor magnet 223 and the impeller 11 are fixed to the inner circumferential surface and the outer circumferential surface, respectively, of the magnet holding cylindrical portion 522 of the second holder member 52, and the cover portion cylindrical portion 523 is fitted to the first holder member 51 from above the first holder member 51. Referring to FIG. 10, an upper plate portion 131 is thereafter attached to a side wall portion 133 fixed to the lower plate portion 132.

Also in the second preferred embodiment, the seal gap 35 being covered with the seal cover 7 contributes to reducing the likelihood that dust will enter into the bearing mechanism 4. In addition, the seal gap 35 being covered with the bushing 26 in an indirect manner contributes to further reducing the likelihood that dust will enter into the bearing mechanism 4. Because entry of dust into the bearing mechanism 4 is prevented when the bearing mechanism 4 is fitted to another member of the blower fan 1a, the fitting of the bearing mechanism 4 to the other member of the blower fan 1a does not need to be carried out in an extremely clean space. Note that, even in the case where both assemblage of the bearing mechanism 4 and the fitting of the bearing mechanism 4 to the other member of the blower fan 1a are carried out in a clean room, covering of the seal gap 35 with the seal cover 7 contributes to reducing the likelihood that an extraneous material will be adhered to a surface of the lubricating oil. As a result, an improvement in reliability of the bearing mechanism 4 is achieved.

An improvement in flexibility in assembling the blower fan 1a is achieved by the rotor holder 5 being made up of the first and second holder members 51 and 52, which are separate members.

In the case where the lower plate portion can be attached to the bushing only from above the bushing, the lower plate portion, the stator, and the second holder member, in the order named, need to be attached to the bearing mechanism. In contrast, in the case of the bearing mechanism 4, the lower plate portion 132 can be attached to the bushing 26 from below the bushing 26, and therefore, each of the stator 210 and the second holder member 52 may be attached to the bearing mechanism 4 either before or after the lower plate portion 132 is attached to the bearing mechanism 4. As a result, an improvement in flexibility in assembling the blower fan 1a is achieved.

Figure 12:
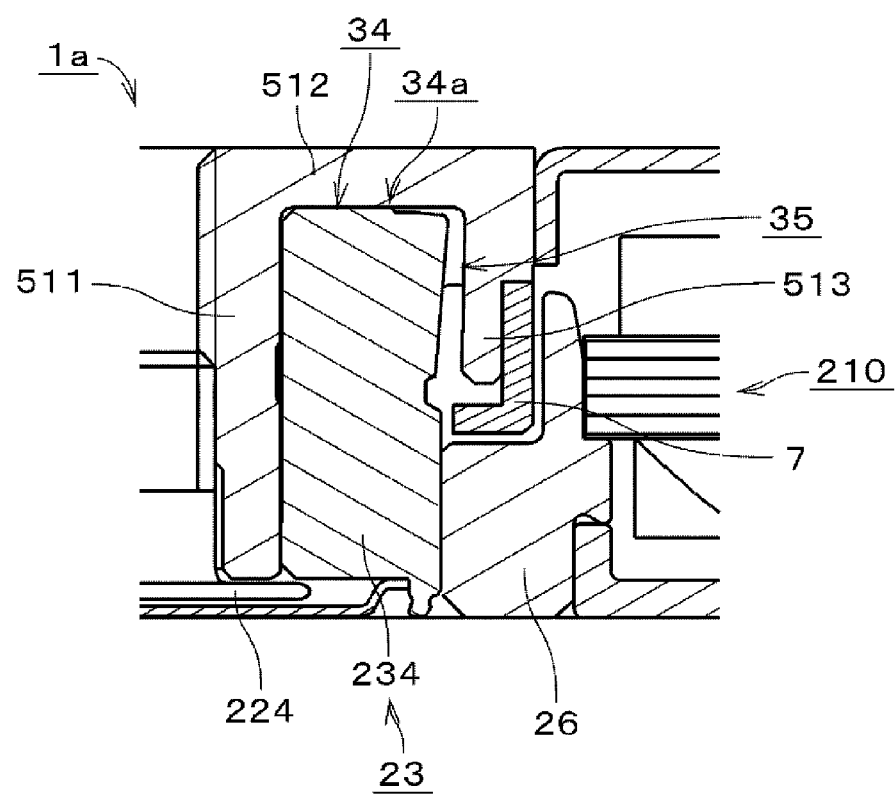
FIG. 12 is a diagram illustrating a bearing portion according to a modification of the second preferred embodiment.

FIG. 12 is a diagram illustrating a bearing portion 23 of a blower fan 1a according to a modification of the second preferred embodiment. The bearing portion 23 of the blower fan 1a may include a large sleeve 234 made of a metal, similarly to each of the bearing portions 23 illustrated in FIGS. 8 and 9. A bushing 26 is fixed to a lower portion of an outer circumferential surface of the sleeve 234. A seal gap 35 is defined between an upper portion of the outer circumferential surface of the sleeve 234 and an inner circumferential surface of a rotor cylindrical portion 513. The seal gap 35 has a surface of a lubricating oil defined therein. The seal gap 35 is covered with a seal cover 7. A first thrust gap 34 is defined between a lower surface of a first thrust portion 512 and an upper surface of the sleeve 234, and an upper thrust dynamic pressure bearing portion 34a is defined in the first thrust gap 34. Note that no thrust dynamic pressure bearing portion is defined between a second thrust portion 224 and a lower surface of the sleeve 234. The second thrust portion 224 is arranged to function as a portion that prevents a shaft 511 from coming off.

In the blower fan 1a, an axial magnetic center of a stator 210 is arranged at a level lower than that of an axial magnetic center of a rotor magnet 223 as is the case with FIG. 11, and a magnetic attraction force that attracts the rotor magnet 223 downward is thereby generated between the stator 210 and the rotor magnet 223. Also in the modification of the second preferred embodiment illustrated in FIG. 12, covering of the seal gap 35 with the seal cover 7 contributes to preventing dust from entering into a bearing mechanism 4.

Figure 13:
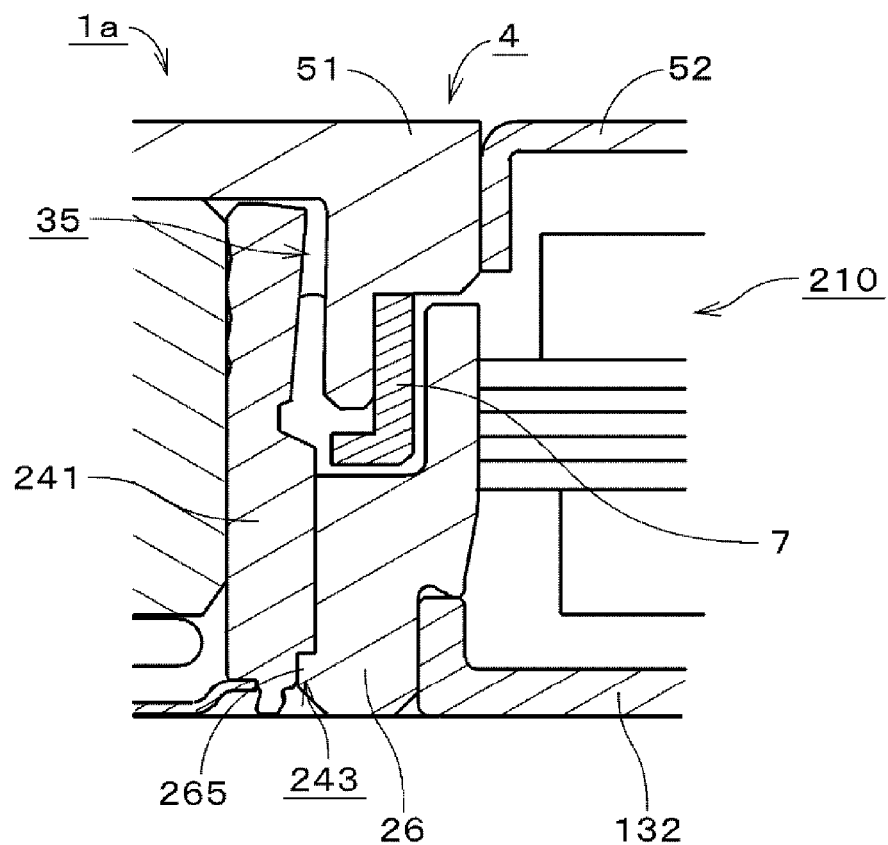
FIG. 13 is a diagram illustrating a bushing according to a modification of the second preferred embodiment.

FIG. 13 is a diagram illustrating a bearing mechanism 4 of a blower fan 1a according to a modification of the second preferred embodiment. In the blower fan 1a, a bushing 26 does not include the raised portion 261. In addition, a lower portion of the bushing 26 includes a projection 265 arranged to project radially inward. The blower fan 1a according to the present modification of the second preferred embodiment is otherwise similar in structure to the blower fan 1a illustrated in FIG. 10. A lower portion of an outer circumferential surface of a housing cylindrical portion 241 includes a shoulder portion 243 defined by a decrease in the diameter of the outer circumferential surface of the housing cylindrical portion 241. The projection 265 is arranged to be in axial contact with the shoulder portion 243. This makes it possible to attach the bushing 26 to the housing cylindrical portion 241 such that the bushing 26 is axially positioned with high precision relative to the housing cylindrical portion 241.

When the blower fan 1a is assembled, a stator 210 is attached to an outer circumferential surface of the bushing 26 from below the bearing mechanism 4. Next, a lower plate portion 132 is attached to the lower portion of the bushing 26. A second holder member 52 is fitted to a first holder member 51 from above the first holder member 51. Also in the blower fan 1a according to the present modification of the second preferred embodiment, a seal gap 35 is covered with a seal cover 7, and this contributes to preventing dust from entering into the bearing mechanism 4 when the blower fan 1a is assembled. Note that, in the case of the blower fan 1a, the stator 210 may be attached to the outer circumferential surface of the bushing 26 from above the bearing mechanism 4.

Figure 14:
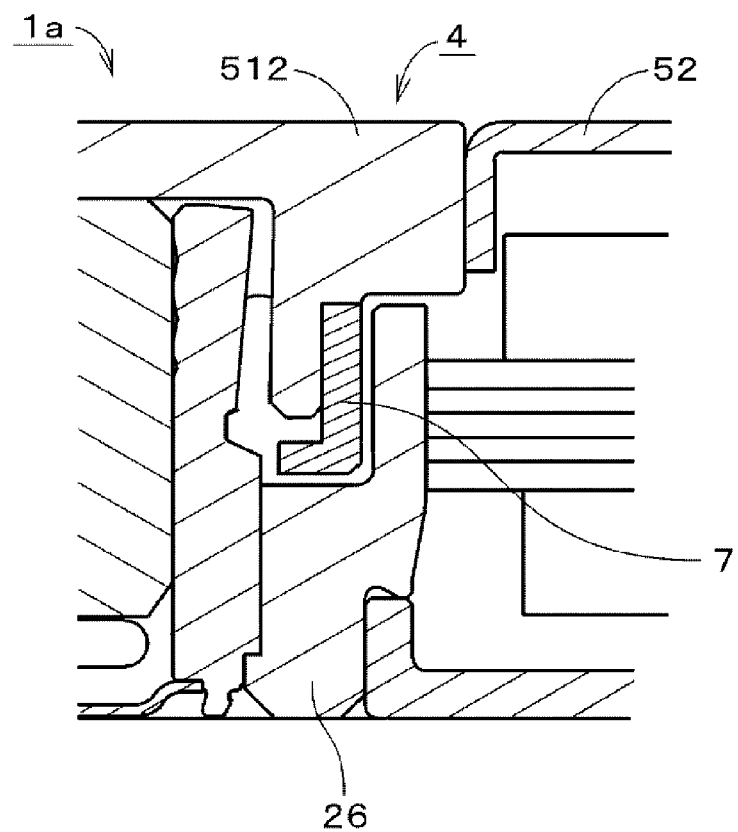
FIG. 14 is a diagram illustrating a first holder member according to a modification of the second preferred embodiment.

FIG. 14 is a diagram illustrating a bearing mechanism 4 of a blower fan 1a according to a modification of the second preferred embodiment. A bushing 26 of the blower fan 1a is arranged to have an outside diameter smaller than that of a first thrust portion 512. The bearing mechanism 4 according to the present modification of the second preferred embodiment is otherwise similar in structure to the bearing mechanism 4 illustrated in FIG. 13. When the blower fan 1a is assembled, it is possible to attach a second holder member 52 to the first thrust portion 512 with an outer edge portion of the first thrust portion 512 supported from below. Thus, assemblage of the blower fan 1a can be accomplished easily.

Figure 15:
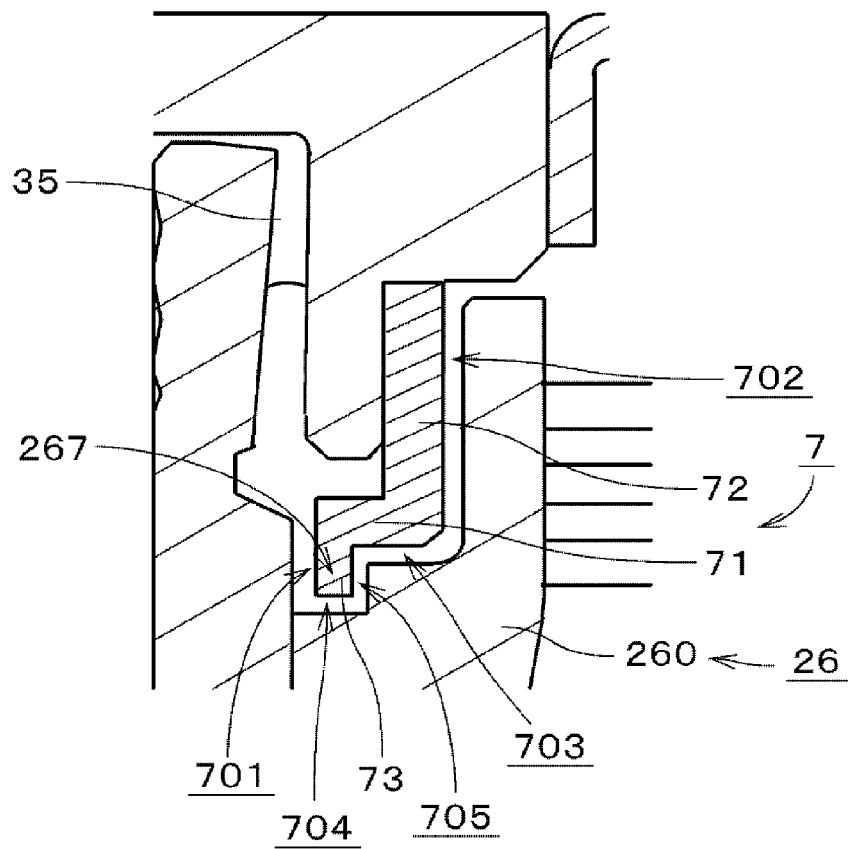
FIG. 15 is a diagram illustrating a seal cover according to a modification of the second preferred embodiment.

FIG. 15 is a diagram illustrating a seal cover 7 and a bushing 26 of a bearing mechanism 4 according to a modification of the second preferred embodiment. The bearing mechanism 4 according to the present modification of the second preferred embodiment is otherwise similar in structure to the bearing mechanism 4 illustrated in FIG. 13, but may be otherwise similar in structure to the bearing mechanism 4 according to the first or second preferred embodiment.

The seal cover 7 includes an inner flange portion 71 and a fixing portion 72, and is arranged to cover a seal gap 35, similarly to the seal cover 7 according to the first preferred embodiment. The seal cover 7 further includes a cylindrical portion 73 arranged to extend downward from an inner circumferential portion of the inner flange portion 71. Meanwhile, a bushing base portion 260, which is an axially opposing portion, includes a recessed portion 267. The cylindrical portion 73 is arranged inside the recessed portion 267.

An auxiliary horizontal gap 704 extending radially is defined between a lower end of the cylindrical portion 73 and a bottom surface of the recessed portion 267. A lower end of a first vertical gap 701 and a radially inner end portion of the auxiliary horizontal gap 704 are joined to each other. That is, the first vertical gap 701 and the auxiliary horizontal gap 704 are continuous with each other. An auxiliary vertical gap 705 is defined between an outer circumferential surface of the cylindrical portion 73 and an inside surface of the recessed portion 267. A radially outer end portion of the auxiliary horizontal gap 704 and a lower end of the auxiliary vertical gap 705 are joined to each other. That is, the auxiliary horizontal gap 704 and the auxiliary vertical gap 705 are continuous with each other. In addition, an upper end of the auxiliary vertical gap 705 and a radially inner end portion of a horizontal gap 703 are joined to each other. That is, the auxiliary vertical gap 705 and the horizontal gap 703 are continuous with each other.

As described above, in the bearing mechanism 4 illustrated in FIG. 15, a more complicated labyrinth structure is defined by the first vertical gap 701, the auxiliary horizontal gap 704, the auxiliary vertical gap 705, the horizontal gap 703, and a second vertical gap 702. Moreover, an improvement in strength of the seal cover 7 is achieved because of the cylindrical portion 73.

Figure 16:
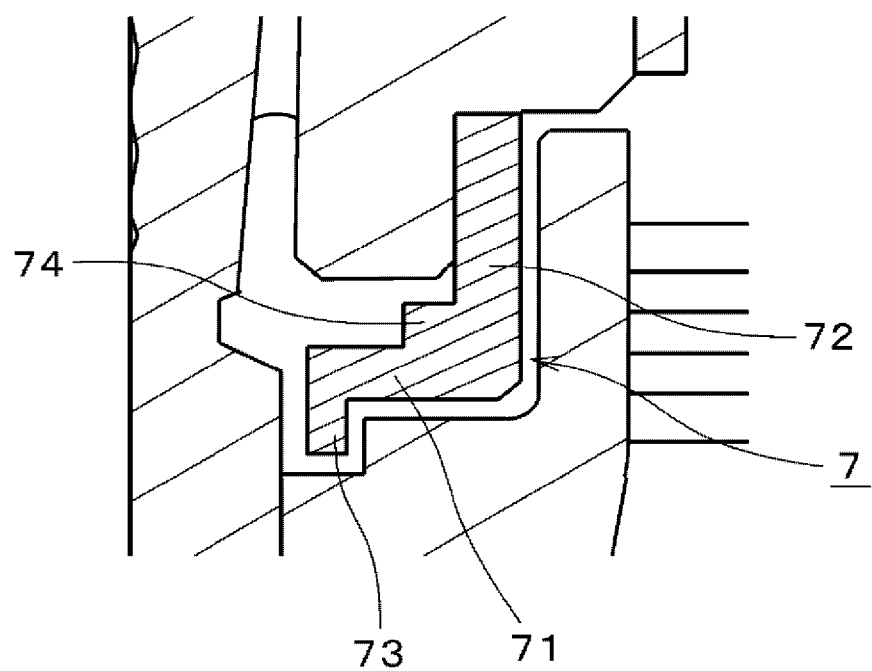
FIG. 16 is a diagram illustrating a seal cover according to another modification of the second preferred embodiment.

FIG. 16 is a diagram illustrating a seal cover 7 according to a modification of the second preferred embodiment. The seal cover 7 includes an inner flange portion 71, a fixing portion 72, and a cylindrical portion 73 similarly to the seal cover 7 illustrated in FIG. 15, and further includes an expanded portion 74. The seal cover 7 is defined by a single member.

The expanded portion 74 is arranged at a junction between the inner flange portion 71 and the fixing portion 72. The expanded portion 74 can be considered to be a portion defined by an increased axial width of the inner flange portion 71 relative to the axial width of a remaining portion of the inner flange portion 71. Since the inner flange portion 71 expands upward in the expanded portion 74, the expanded portion 74 can also be considered to be a portion defined by an increased radial width of the fixing portion 72. Although the expanded portion 74 illustrated in FIG. 16 is defined by a radially outward stepwise increase in the axial width of the inner flange portion 71, the manner of the increase in the axial width of the inner flange portion 71 may be modified in a variety of manners. For example, referring to FIG. 17, the expanded portion 74 may be defined by a gradual radially outward increase in the axial width of the inner flange portion 71.

Provision of the expanded portion 74 contributes to increasing rigidity of the seal cover 7 at the junction between the inner flange portion 71 and the fixing portion 72, and thereby improving strength of the seal cover 7. Note that only one of the cylindrical portion 73 and the expanded portion 74 may be provided as necessary.

Figure 17:
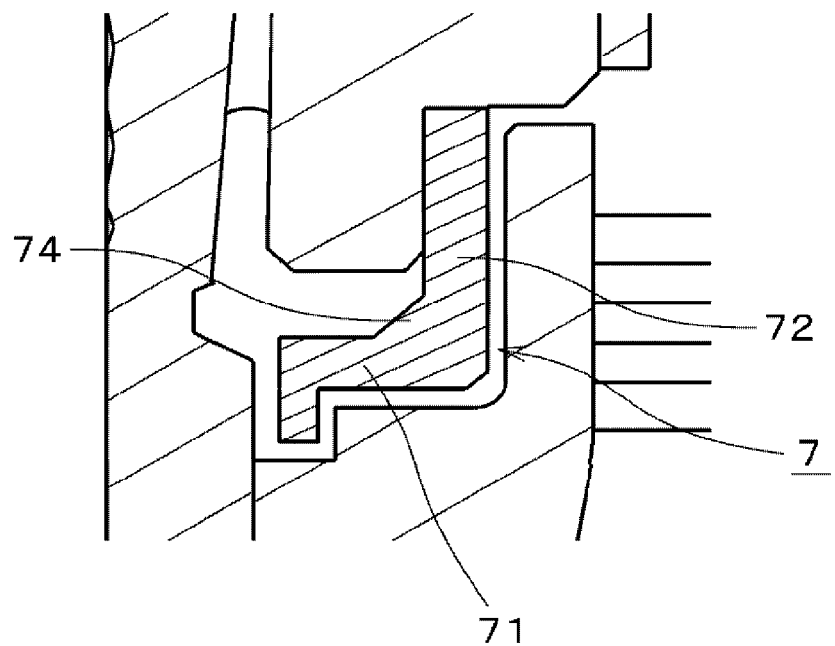
FIG. 17 is a diagram illustrating a seal cover according to yet another modification of the second preferred embodiment.

Note that each of the bearing portions 23 illustrated in FIGS. 15 to 17 may be modified to have the structure of any of the bearing portions 23 illustrated in FIGS. 2, 8, and 9 or any other desired structure. Also note that the structure of the rotor holder 5 may be arranged such that the rotor holder 5 includes the first and second holder members 51 and 52 as illustrated in FIG. 10, and that the rotor holder 5 may be arranged to have another structure. In the case where the rotor holder 5 is arranged to have the structure as illustrated in FIG. 10, the seal cover 7 is preferably arranged to have an outside diameter smaller than that of the first thrust portion 512, similarly to the seal cover 7 illustrated in FIG. 14.

While preferred embodiments of the present invention have been described above, it is to be understood that the present invention is not limited to the above-described preferred embodiments, and that a variety of modifications are possible.

In the bearing mechanism 4 illustrated in FIG. 2, the first thrust dynamic pressure groove array 273 is defined in the upper surface 231b of the sleeve 231. Note, however, that the first thrust dynamic pressure groove array 273 may be defined in an upper surface of the bearing housing 232. In this case, the upper thrust dynamic pressure bearing portion 34a is defined between the lower surface of the first thrust portion 222d and a portion of the upper surface of the bearing housing 232 in which the first thrust dynamic pressure groove array 273 is defined. Also note that thrust portions arranged opposite to the bearing portion 23 to define thrust dynamic pressure bearing portions are not limited to the thrust portions according to the above-described preferred embodiments, as long as the thrust portions are arranged around the shaft in the annular shape. The same is true of the bearing mechanisms 4 according to the other preferred embodiments of the present invention.

Note that each of the first and second radial dynamic pressure groove arrays may be defined in the outer circumferential surface of the shaft 221 in a modification of any of the above-described preferred embodiments. Also note that the first thrust dynamic pressure groove array may be defined in the lower surface of the first thrust portion 222d. Also note that the second thrust dynamic pressure groove array may be defined in the upper surface of the second thrust portion 224. Also note that the first thrust dynamic pressure groove array may be made up of a collection of grooves arranged in the herringbone pattern. Also note that the second thrust dynamic pressure groove array may also be made up of a collection of grooves arranged in the herringbone pattern.

Note that, in a modification of the first preferred embodiment, the outer circumferential surface of the bushing 26 may be a cylindrical surface centered on the central axis J1. Also note that the diameter of the outer circumferential surface of the bushing 26 may be arranged to gradually increase with increasing height. Even in this case, it is possible to attach the lower plate portion 132 to the bushing 26 from below the bushing 26. The same is true of the second preferred embodiment.

Note that the downward facing surface which is arranged opposite to the upper surface of the second thrust portion 224 in the plate accommodating portion 239 is not limited to the lower surface of the sleeve 231. That is, the lower thrust dynamic pressure bearing portion may be defined between the second thrust portion 224 and a member other than the sleeve 231.

Note that, in a modification of any of the preferred embodiments illustrated in FIGS. 2 and 11, the outer circumferential surface of the bearing portion 23 may be arranged to include a projection arranged to project radially outward and which is arranged to be in axial contact with an upper portion of an inner circumferential portion of the bushing 26 which functions as the axially opposing portion. The axial position of the bushing 26 relative to the bearing portion 23 can thereby be determined easily.

Note that, in a modification of any of the above-described preferred embodiments, only the first vertical gap 701 may be defined by the seal cover 7. In other words, neither the horizontal gap 703 nor the second vertical gap 702 may be defined between the seal cover 7 and the bushing 26. Even in this case, entry of extraneous materials into the seal gap 35 is reduced or prevented.

The blower fan is particularly suitably used to cool electronic components in a slim device, such as a tablet personal computer, a notebook personal computer, or the like.

Bearing mechanisms according to preferred embodiments of the present invention may be used in motors used for a variety of purposes. Blower fans including the bearing mechanisms according to preferred embodiments of the present invention may be used, for example, to cool electronic components in cases, or to supply air to a variety of objects. Further, the blower fans may be used for other purposes as well.

What is claimed is:

1. A bearing apparatus comprising:
    a bearing portion arranged substantially in a shape of a cylinder with a bottom;
    a shaft inserted in the bearing portion, and arranged to rotate about a central axis relative to the bearing portion;
    an upper thrust portion arranged to extend radially outward from an upper end portion of the shaft;
    a rotor cylindrical portion arranged to extend downward from an outer edge portion of the upper thrust portion, and arranged radially outward of the bearing portion; and
    an annular seal cover fixed to an outer circumferential surface of the rotor cylindrical portion; wherein
    an inner circumferential surface of the rotor cylindrical portion and an outer circumferential surface of the bearing portion are arranged to together define a seal gap therebetween, the seal gap including a seal portion having a surface of a lubricating oil defined therein;
    an inner circumferential surface of the bearing portion and an outer circumferential surface of the shaft are arranged to together define a radial gap therebetween, the radial gap including a radial bearing portion arranged to support the shaft in a radial direction;
    an upper surface of the bearing portion and a lower surface of the upper thrust portion are arranged to together define a thrust gap therebetween, the thrust gap including a thrust bearing portion arranged to support the upper thrust portion in an axial direction; and
    the seal cover includes:
        a fixing portion fixed to the outer circumferential surface of the rotor cylindrical portion; and
        an inner flange portion arranged to extend radially inward from the fixing portion below a lower end portion of the rotor cylindrical portion, and having an inner circumferential portion arranged opposite to the outer circumferential surface of the bearing portion to define a vertical gap together with the outer circumferential surface of the bearing portion.

2. The bearing apparatus according to claim 1, wherein a minimum width of the vertical gap is arranged to be smaller than a maximum width of the seal gap.

3. The bearing apparatus according to claim 1, further comprising another seal cover fixed to the outer circumferential surface of the bearing portion below the inner flange portion, wherein the other seal cover includes:
    an axially opposing portion arranged to extend radially outward from the outer circumferential surface of the bearing portion, and arranged axially opposite a lower surface of the inner flange portion to define a horizontal gap together with the inner flange portion; and
    a radially opposing portion arranged to extend upward continuously from the axially opposing portion, and arranged opposite to an outer circumferential surface of the fixing portion of the seal cover to define another vertical gap together with the fixing portion.

4. The bearing apparatus according to claim 3, wherein a minimum width of the other vertical gap is arranged to be smaller than a maximum width of the seal gap.

5. The bearing apparatus according to claim 3, wherein a minimum width of the other vertical gap is arranged to be smaller than a minimum width of the vertical gap.

6. The bearing apparatus according to claim 3, wherein a minimum width of the horizontal gap is arranged to be smaller than a maximum width of the seal gap.

7. The bearing apparatus according to claim 3, wherein
the seal cover further includes a cylindrical portion arranged to extend downward from the inner circumferential portion of the inner flange portion;
the axially opposing portion includes a recessed portion arranged to have the cylindrical portion arranged thereinside;
a lower end of the cylindrical portion and a bottom surface of the recessed portion are arranged to together define an auxiliary horizontal gap continuous with the vertical gap therebetween; and
an outer circumferential surface of the cylindrical portion and an inside surface of the recessed portion are arranged to together define an auxiliary vertical gap continuous with both the auxiliary horizontal gap and the horizontal gap therebetween.

8. The bearing apparatus according to claim 3, wherein an outer circumferential surface of the other seal cover is an attachment surface to which a mounting plate arranged to support the bearing portion is attached.

9. The bearing apparatus according to claim 1, wherein
the outer circumferential surface of the rotor cylindrical portion includes a projecting portion arranged to project radially outward; and
an upper end of the fixing portion of the seal cover is arranged to be in axial contact with the projecting portion.

10. The bearing apparatus according to claim 1, wherein
the seal cover is defined by a single member; and
an axial width of the inner flange portion is arranged to increase at a junction between the inner flange portion and the fixing portion.

11. The bearing apparatus according to claim 1, wherein the seal gap, the radial gap, and the thrust gap are arranged to together define a single continuous bladder structure, the lubricating oil is arranged continuously in the bladder structure, and the surface of the lubricating oil defined in the seal gap is the sole surface of the lubricating oil.

12. The bearing apparatus according to claim 1, further comprising a lower thrust portion defined by a thrust plate arranged to extend radially outward from a lower end portion of the shaft; wherein
the bearing portion includes a plate accommodating portion arranged to accommodate the lower thrust portion; and
an upper surface of the lower thrust portion and a downward facing surface of the plate accommodating portion are arranged to together define another thrust gap therebetween, the other thrust gap including another thrust bearing portion arranged to support the lower thrust portion in the axial direction.

13. The bearing apparatus according to claim 1, wherein the bearing portion includes:
a cylindrical sleeve arranged radially outside the shaft to surround the shaft; and
a cap arranged to close a bottom portion of the sleeve.

14. The bearing apparatus according to claim 1, wherein
the bearing portion includes:
a sleeve defined by a metallic sintered body; and
a bearing housing;
the bearing housing includes:
a housing cylindrical portion arranged to cover an outer circumferential surface of the sleeve; and
a cap arranged to close a bottom portion of the housing cylindrical portion; and
the seal gap is defined between the inner circumferential surface of the rotor cylindrical portion and an outer circumferential surface of the housing cylindrical portion.

15. A blower fan comprising:
a motor; and
a plurality of blades arranged to rotate about a central axis through the motor; wherein
the motor includes:
a stationary portion;
the bearing apparatus according to claim 1; and
a rotating portion supported through the bearing apparatus to be rotatable with respect to the stationary portion;
the stationary portion includes:
a stator; and
a mounting plate fixed to the outer circumferential surface of the bearing portion directly or indirectly;
the rotating portion includes:
a cover portion arranged to extend radially outward from the upper thrust portion;
a magnet holding cylindrical portion arranged to extend downward from the cover portion; and
a rotor magnet fixed to an inner circumferential surface of the magnet holding cylindrical portion, and arranged radially outward of the stator; and
the blades are arranged outside an outer circumferential surface of the magnet holding cylindrical portion.

16. The blower fan according to claim 15, wherein the upper thrust portion and the cover portion are defined by separate members.

17. The blower fan according to claim 15, further comprising:
a side wall portion arranged radially outside the blades to surround the blades, and including an air outlet defined therein; and
a plate-shaped upper plate portion arranged above the cover portion, and including an air inlet defined therein.

* * * * *